(12) United States Patent
 Pettersson et al.

(10) Patent No.: US 9,914,150 B2
(45) Date of Patent: Mar. 13, 2018

(54) GRAPHICAL APPLICATION SYSTEM

(71) Applicant: Hexagon Technology Center GmbH, Heerbrugg (CH)

(72) Inventors: Bo Pettersson, London (GB); Klaus Schneider, Dornbirn (AT); Benedikt Zebhauser, Rorschach (CH); Knut Siercks, Mörschwil (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 496 days.

(21) Appl. No.: 14/267,740

(22) Filed: May 1, 2014

(65) Prior Publication Data

US 2014/0242285 A1 Aug. 28, 2014

Related U.S. Application Data

(63) Continuation-in-part of application No. 13/425,118, filed on Mar. 20, 2012, now Pat. No. 8,875,655, and
(Continued)

(30) Foreign Application Priority Data

Sep. 22, 2010 (EP) .................................... 10178353
May 2, 2013 (EP) .................................... 13166334

(51) Int. Cl.
*B05B 15/10* (2006.01)
*B05B 12/12* (2006.01)
(Continued)

(52) U.S. Cl.
CPC ................ *B05D 1/02* (2013.01); *B05B 12/00* (2013.01); *B05B 12/084* (2013.01);
(Continued)

(58) Field of Classification Search
CPC ...... B41J 3/4073; B05B 13/005; B05B 13/04; B05B 15/10
See application file for complete search history.

(56) References Cited

U.S. PATENT DOCUMENTS 4,714,339 A 12/1987 Lau et al.
5,059,266 A 10/1991 Yamane et al.
(Continued)

FOREIGN PATENT DOCUMENTS

CN 1583373 A 2/2005
EP 1 578 600 B1 7/2007
(Continued)

OTHER PUBLICATIONS

European Search Report dated Oct. 17, 2013 as received in Application No. 13 16 6334.
(Continued)

*Primary Examiner* — Dah-Wei D. Yuan
*Assistant Examiner* — Stephen A Kitt
(74) *Attorney, Agent, or Firm* — Maschoff Brennan

(57) ABSTRACT

The invention relates to a graphical application system to apply a desired pattern by multiple tiles onto a target surface. The system comprises a graphical application device comprising a base structure with a trackable optical feature, at least one nozzle for expelling paint, a driving unit for positioning the nozzle and a local camera for a local referencing of the nozzle. A controller controls the driving unit and the expelling of the nozzle to achieve an application of the desired pattern on the target surface. The system also comprises an external referencing device located remote from the graphical application device, for a global referencing of the application device according to the trackable optical feature. The desired pattern is applied with a primary alignment of the application range by the global referencing
(Continued)

and with a fine-alignment of the actual tile to a previously applied tile according to the local referencing.

11 Claims, 6 Drawing Sheets

Related U.S. Application Data a continuation-in-part of application No. 13/823,539, filed as application No. PCT/EP2011/066356 on Sep. 20, 2011, said application No. 13/425,118 is a continuation-in-part of application No. PCT/EP2011/066356, filed on Sep. 20, 2011.

(51) Int. Cl.
*B05B 13/04* (2006.01)
*B05D 1/02* (2006.01)
*B05B 12/08* (2006.01)
*B05B 13/00* (2006.01)
*G01B 11/00* (2006.01)
*B05B 12/00* (2018.01)
*B41J 3/407* (2006.01)
*G01S 17/66* (2006.01)
*G01S 5/02* (2010.01)
*G01S 19/38* (2010.01)
*H04N 13/02* (2006.01)

(52) U.S. Cl.
CPC .......... *B05B 12/122* (2013.01); *B05B 12/124* (2013.01); *B05B 13/005* (2013.01); *B05B 13/04* (2013.01); *B05B 15/10* (2013.01); *B41J 3/407* (2013.01); *G01B 11/002* (2013.01); *B05B 13/0405* (2013.01); *B41J 3/4073* (2013.01); *G01S 5/02* (2013.01); *G01S 17/66* (2013.01); *G01S 19/38* (2013.01); *H04N 13/0246* (2013.01)

(56) References Cited

U.S. PATENT DOCUMENTS

| | | | |
|---|---|---|---|
| 5,848,769 A | 12/1998 | Fronek et al. | |
| 6,096,132 A | 8/2000 | Kaiba et al. | |
| 6,360,656 B2 | 3/2002 | Kubo et al. | |
| 7,070,850 B2 | 7/2006 | Dietz et al. | |
| 7,350,890 B2 | 4/2008 | Baird et al. | |
| 7,922,272 B2 | 4/2011 | Baird et al. | |
| 2005/0100680 A1* | 5/2005 | Bustgens | B05B 12/04 427/427.1 |
| 2005/0242205 A1 | 11/2005 | Jarvis | |
| 2006/0044376 A1* | 3/2006 | Baird | B41J 11/002 347/102 |
| 2006/0221403 A1 | 10/2006 | Bancel | |
| 2007/0209586 A1 | 9/2007 | Ebensberger | |
| 2008/0152807 A1 | 6/2008 | Baird et al. | |
| 2009/0022879 A1 | 1/2009 | Bustgens et al. | |
| 2009/0179081 A1 | 7/2009 | Charpie | |
| 2010/0304009 A1 | 12/2010 | Bausen et al. | |
| 2011/0199430 A1 | 8/2011 | Yajima et al. | |

FOREIGN PATENT DOCUMENTS

| | | |
|---|---|---|
| EP | 1 987 889 A1 | 11/2008 |
| EP | 2 433 716 A1 | 3/2012 |
| EP | 2 641 661 A1 | 9/2013 |
| FR | 2 850 322 A1 | 7/2004 |
| JP | S48-9660 Y1 | 3/1973 |
| JP | S61-167965 U | 10/1986 |
| JP | H02-301130 A | 12/1990 |
| JP | H11-104578 A | 4/1999 |
| JP | H11-267560 A | 10/1999 |
| JP | 2005-103420 A | 4/2005 |
| JP | 2006-320825 A | 11/2006 |
| WO | 82/00906 A1 | 3/1982 |
| WO | 03/066239 A1 | 8/2003 |
| WO | 2011/124318 A1 | 10/2011 |

OTHER PUBLICATIONS

"Tracking-Interferometer", Wikipedia-de, Accessed Aug. 30, 2017, https://de.wikipedia.org/wiki/Tracking-Interferometer.
Martin, Joel, "Quality 101: Laser Tracking Fundamentals", Quality Magazine (May 14, 2007).
Secula, Erik, "PML Expertise and Collaborations Lead to Portable Test Solution for Laser Trackers", NIST (Dec. 28, 2015), www.nist.gov/news-events/news/2015/12/pml-expertise-and-collaborations-leadportable-test-solution-laser-trackers.
Hamann, Roland et al., "Photogrammetrie Seminarvortrag: Laser Tracking", Bochum University of Applied Sciences (Oct. 2007).
"Laser tracker", Wikipedia, Accessed Aug. 30, 2017, https://en.wikipedia.org/w/index.php?title=Laser_tracker&oldid=790370403.
Bridges, Bob, "How Laser Trackers Work", Quality Digest (Jun. 25, 2009), https://www.qualitydigest.com/inside/twitter-ed/how-lasertrackers-work.html.

* cited by examiner

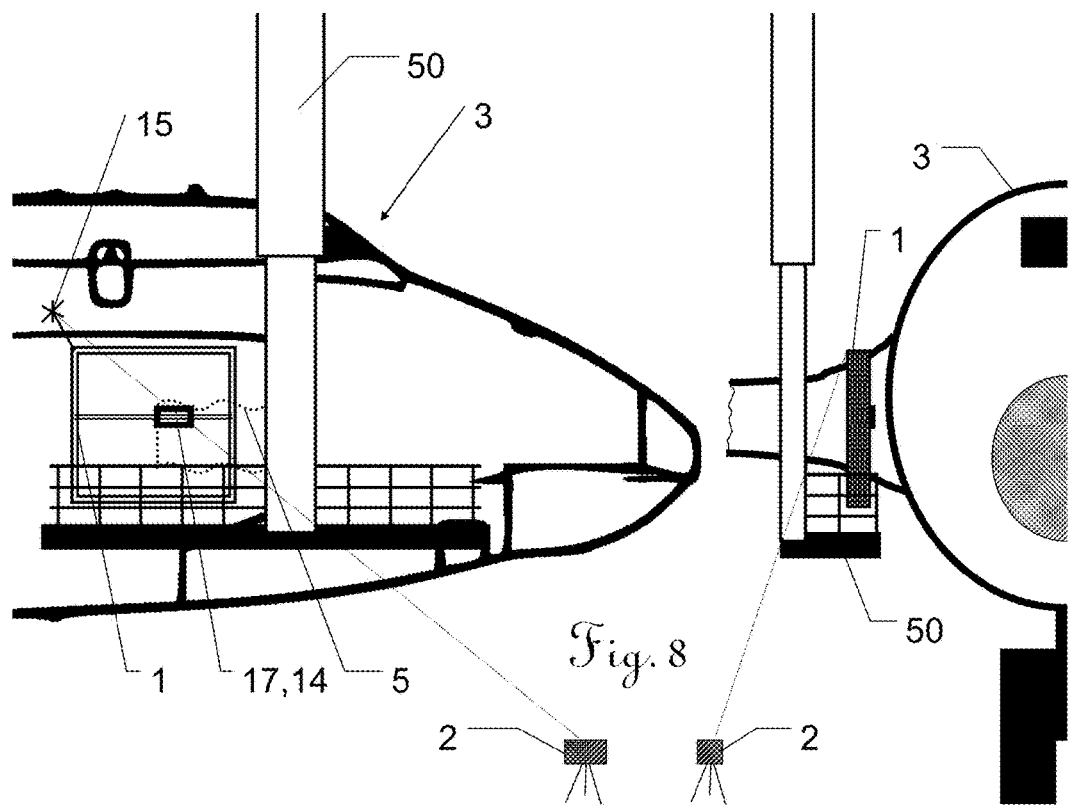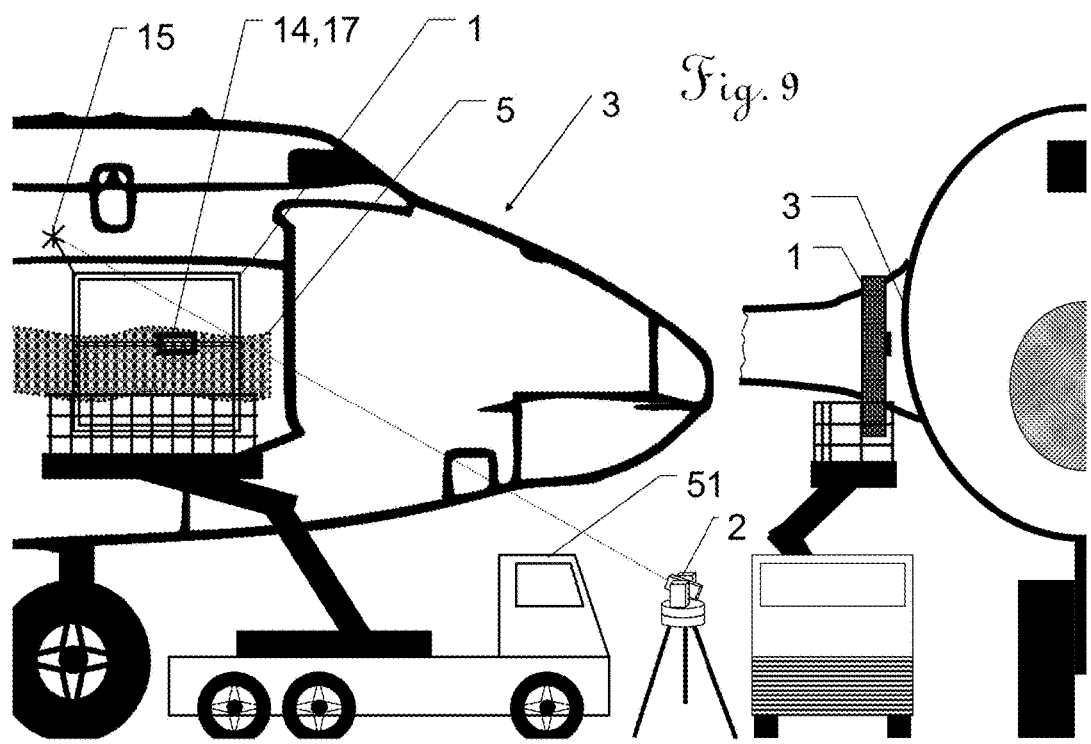

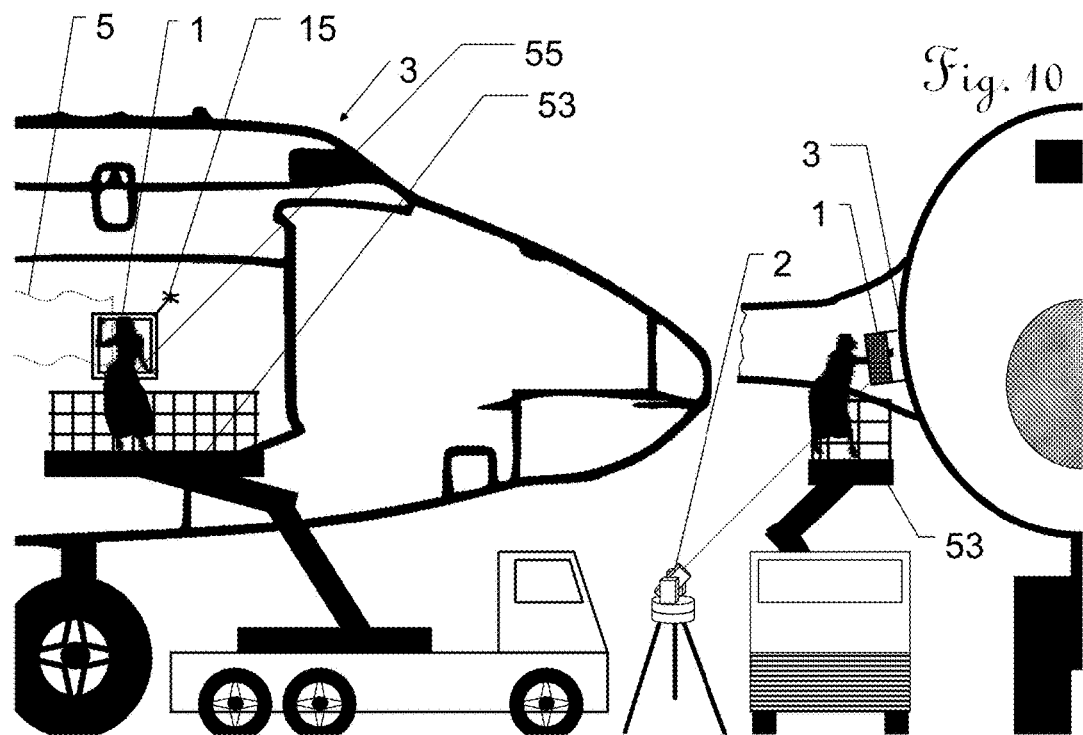
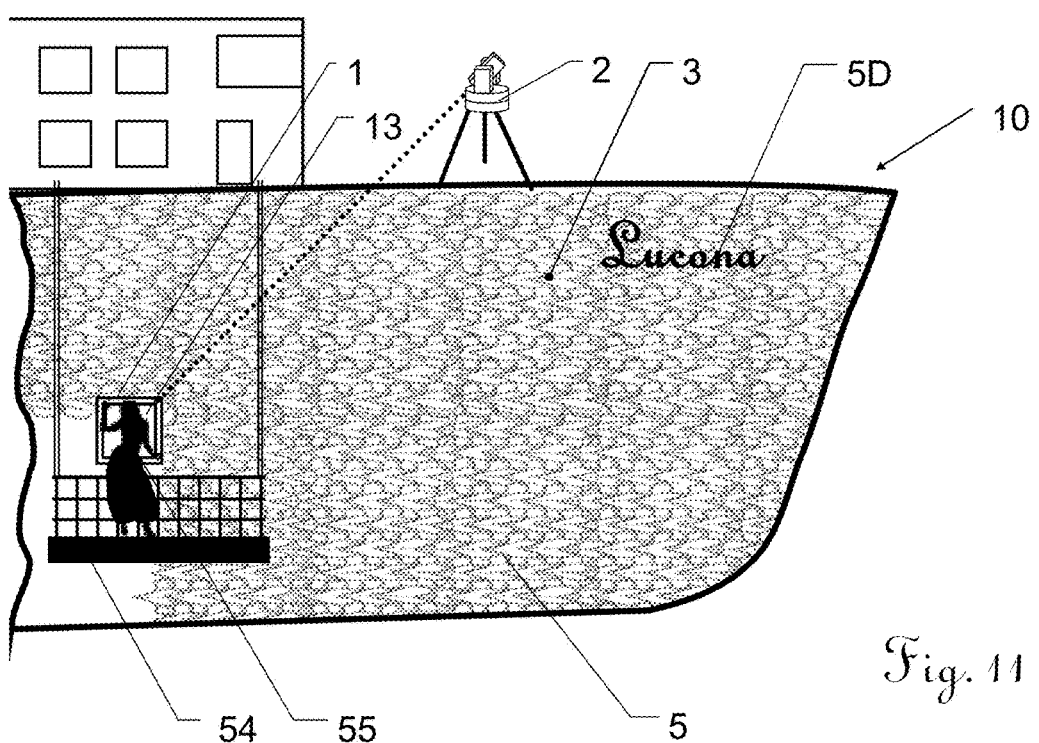

GRAPHICAL APPLICATION SYSTEM

FIELD OF THE INVENTION

The present invention relates generally to a graphical application system to a graphical application method and to a computer program product.

BACKGROUND

The desire to apply a layer of material onto a target surface exists in a lot of different technological areas. There are various reasons for applying materials to surfaces, with the most common being the desire to fulfil aesthetic demands such as the desire to apply certain, often multi-coloured, graphical patterns onto the surface or on certain areas of the surface or to protect the surface against environmental influence. An application of a desired pattern according to the present invention can for example also be used in areas where in prior art decals were used for embellishing or decorating a surface with a desired pattern or to apply desired markings on the surface.

The technical areas wherein such painting, spattering, inking, dyeing or coating is desired, range for example from construction work, advertising, amusement, markings on sport grounds, road marking, camouflaging, car manufacturing, machinery building, indoor and outdoor wall claddings, applying advertisements to large trucks, semi-trailers, buses, aircrafts, vessels, etc. Also, a repair of already—at least partially—painted or decorated surfaces which became worn out, damaged, sabotaged, partly replaced, etc. is often required. In such repair or replacement work, it is desired to achieve a high degree of colour and pattern matching for a smooth and optically uniform transition from the old to the new application.

Painting a pre-defined pattern such as a logo or an image, which is digitally available as a picture, CAD file, etc. and which should be applied to a surface, can be quite demanding. Using a brush or airbrush requires a skilled craftsman, who needs experience and knowledge in the guidance and reliable handling of the tool, as well as knowledge of paint viscosity, drying conditions and various other parameters during labour. Another, industrially often used solution is to mask the undesired areas of the target surface by adhesive tapes and/or adhesive foils, which are removed after the application has finished. Another approach is to directly apply decorated adhesive foils or decals to the target, as substrates already carrying or shaped to the desired pattern. In any case, an additional layer of transparent over-coating can be required to protect the artwork and/or to achieve a smoother surface.

A common principle used to apply material onto a surface is to expel or eject the material—such as paint—from a nozzle means onto a target surface. The so called inkjet technology was first disclosed in the British patent Nr. 2,147 by Lord Kelvin and from thereon continuously evolved to the present continuous (CIJ) and Drop-on-demand (DOD) technology as e.g. used in contemporary ink-jet printers, where the DOD technology is often embodied by thermal DOD or piezoelectric DOD. New ink-jet technology, which is expelling droplets of spattering materials out of a nozzle in a well defined manner (comparable to the systems used in the abovementioned contemporary ink-jet printers for home or office use) is available to paint with narrow spot sizes of less than one centimeter even from 10 cm distance. Such low divergence expelling techniques allow an application of a desired pattern without masking the desired target area and a real-time colour mixing or colour changing, colour fading from one colour to another or the like. Ink-jet material deposition is also an emerging manufacturing technique in which ink-jet technology is used to deposit materials on substrates in order to build up 3D objects.

As example for surface applications, the document FR 2 850 322 discloses a device for printing an image on a large surface that may be held and moved manually. The device, which is able to determine position and direction on a surface, uses the knowledge of its current position to determine which colour needs to be applied onto the surface. This determination is accomplished by matching the determined coordinates and an image stored in a memory of the device. The stored image may then be superimposed to the surface to be painted.

JP 2006-320825 shows a self-regulating painting vehicle for a uniform paint coating an aircraft. It includes arm control means to control operation and movement of an arm with an actuator head. A painting process with respect to a surface to be uniformly coated is performed based on the information of the coating area stored in a memory means and the attitude and position information of said arm. The position of the vehicle and the head are determined using a GPS and a rangefinder measures the distance between the head and the aircraft surface.

WO 03 066 239 discloses an application of paint on architecture in accordance to a digital image by a movable applicator. The applicator has an array of nozzles for expelling paint fixed to its body which are moved over the surface, in particular by hand. Paint is only applied if a real time determined position of the applicator is within an acceptance threshold. US 2006/221,403 shows a similar device for a handheld application of a desired pattern.

US 2009/0022879 relates to a method for applying paints or varnishes to large surfaces by means of a displaceable, paint applying device which is controlled in a position-dependent manner. Said device comprises a displaceable part of a real time position measuring system which uses reference marks fixed at known positions on the surface.

US 2008/152,807, US 2011/199,431, U.S. Pat. No. 7,350,890 and U.S. Pat. No. 7,922,272 are referring to methods and devices for applying an accurately positioned graphic image on a large contoured surface, such as the body of an aircraft. The apparatus used therein comprise a rail guidance system to be mounted on a portion of the surface on which the graphic image is to be applied. The graphic image application system is controlled by software to operate a positioning system and a graphic image application system. In EP 1 987 889 and US 2006/044376 a paint applicator is automatically moved within a Cartesian coordinate frame structure.

The mounting of such guide rails can be quite challenging. Their position and/or orientation is influencing the result of the application, e.g. in its position and/or orientation on the target surface and also the alignments of multiple tiles relative to each other. Also, the mounting of the guides is quite time consuming and as the target objects do not provide referenced fixation means for such guides, suction cups, lashing straps or belts around the target have to be used to attach the guides, which are difficult to apply with high positional accuracy.

In U.S. Pat. No. 6,096,132 a distance sensor is used to control a three dimensionally movable nozzle to achieve a constant application distance. U.S. Pat. No. 6,360,656 determines an inclination of the target surface and adjusts the expelling accordingly. In US 2010/304,009 a sensor at the applicator determines a three dimensional shape of the target surface and therewith controls and coordinates the 3D movement and expelling of the applicator to produce a desired a picture-motif on the target.

EP 2 433 716 concerns a handheld, surface spattering device with a nozzle and a nozzle control mechanism to control characteristics of the expelling of the nozzle. A spatial referencing unit references the spattering device relative to the target surface and a computation means controls the expelling according to the spatial referencing to achieve a desired spattering.

As it is not feasible to apply large desired patterns to a target at once, in a single application step, the desired pattern has to be split into sections or tiles, which are subsequently applied. Therein, the alignment of the borders of the individual tiles of such subsequent applications, have to be accurately aligned, in particular as human observers are very sensitive for misalignments. Nevertheless, by an application which is only based on a direct alignment of the tiles against their direct neighbour, the whole of the large pattern tends to be distorted or misaligned on the target surface. Only slight inaccuracies of the tiles and their position and/or orientation will sum up and end not only in an inaccurate position and orientation of the large pattern as a whole but also in geometrical conflicts of the tiles, like gaps, overlappings, etc.

SUMMARY

Some embodiments of the present invention provide for an improved graphical application system or surface decoration system for applying a desired pattern onto a target surface.

Some embodiments of the present invention provide an improved graphical application system which can apply paint onto the target surface according to a desired pattern in multiple subsequently applied tiles at a desired position on the target surface and with seamless transitions of the tiles on the target surface.

Some embodiments provide a graphical application system which avoids time consuming preparations of the target and/or its surrounding before the actual application process can be executed.

Some embodiments aid the user in fulfilling the application tasks and to achieve the desired application results, in particular over large target areas which are larger than the application range of the application device used.

Some embodiments provide a method and system to optimize the target surface by the application and/or which is able to automatically compensate for inaccuracies of the target surface, the desired pattern and/or the application which can always occurred in fieldwork.

Some embodiments not only improve the target surface by an application according to aesthetic demands but in view of technical demands or a combination of both, in particular not only to apply a visible, flat 2D desired pattern, but also to structure the target surface with a topography or topology comprising advantageous micro- or nanostructures in three dimensions by the application.

In some embodiments, the graphical application system, which is used to apply a desired pattern onto a target surface, in particular to apply the desired pattern with paint onto a large area free-form target surface which can be arbitrarily formed, comprises a graphical application device and an external referencing device.

The graphical application device of the system comprises a base or frame structure, with at least one trackable optical feature at the base, at least one nozzle for expelling material (e.g. paint) onto the target surface and a driving unit for positioning the nozzle with respect to the base in at least two dimensions in order to adjust an expelling aim of the nozzle on the target surface. For the application device, an application range is defined as an area within which the nozzle is positionable by the driving unit.

The application device also comprises a local camera directed towards the target for a local referencing of the nozzle with respect to a visual feature by partially imaging the target surface. In particular, the local camera can be moved with the nozzle. The visual feature can e.g. be a previously applied section of the desired pattern, which is spatially referenced in an image of the local camera by image recognition.

In particular, the local referencing by the local camera can be done with a positional accuracy or resolution in the mm or sub mm range, preferably with a spatial resolution of the local referencing being in the range of or higher than the achievable resolution of the application device (e.g. with a spatial resolution better than the achievable dots per inch of inkjet-type printing head with application nozzles and the driving unit), more in particular below one Millimeter. The local referencing can be relative to the visual feature at the target surface and not globally absolute with respect to a target surface coordinate system.

A controller controls the driving unit and the expelling of the nozzle according to an actual position of the nozzle and the desired pattern, in such a way to achieve an application of the desired pattern on the target surface, for example with paint expelled by the nozzle.

The external referencing device of the system is a surveying instrument located remote from the graphical application device, for a global referencing of the base of the graphical application device with respect to the target surface according to the trackable optical feature of the application device. The referencing is done in at least three degrees of freedom, in particular in at least five degrees of freedom. The trackable optical feature can for example be attached to or embodied by the base.

In particular, the global referencing by the external referencing device can be done with a positional accuracy or resolution in the range of Millimeters, Centimeters or above, preferably with an achievable spatial resolution of the global referencing being lower than the achievable resolution of the local referencing, more in particular at least ten times or more of the local referencing resolution, but globally absolute with respect to a target surface coordinate system.

As the desired pattern is larger than the application range, the desired pattern is split into multiple tiles, which tiles are fitting within the application range and which tiles will be subsequently applied with a stepwise relocation of the graphical application device with respect to the target surface.

The application device is built in such a way to apply the desired pattern, with a primary alignment of the application range (respectively an actual tile to be applied within the application range) with respect to the target object that is determined by the global referencing in combination with a fine-alignment of the actual tile to a previously applied tile by the positioning of the nozzle within the application range that is determined by the local referencing.

In other words, the system controller can be built in such a way to apply the desired pattern with a combination of the primary alignment and the fine-alignment with a stepwise relocation of the application device for an alignment of the application range with respect to the target object (in particular with a relocation with respect to a previous position of the application range) based on information from the global referencing and with a positioning of the nozzle by the driving unit to fine-align the actual tile within the application range to visual features at the target surface, in particular to one or more previously applied tiles, based on information from the local referencing.

The external referencing device can be a geodetic instrument measuring polar coordinates of the application device, in particular determining a global position and orientation of the application device relative to the target surface in six degrees of freedom according to an optical surveying of the trackable optical feature as at least one reference mark at the application device. The geodetic instrument can comprise an optoelectronic distance measurement and an automatic optical tracking and/or recognition and surveying of the trackable optical feature.

The external referencing device can for example be a laser tracker and the application device can comprises a retroreflector as the trackable optical feature. In another example, the external referencing device can be a motorized tachymeter or a total station and the application device which can comprise an automatic target recognition (ATR) for a retroreflector as trackable optical feature.

A communication link between the application device and the external referencing device can be established, in order to exchange spatial referencing information of the global and/or local referencing, in particular a real-time communication link.

According to the present invention, the application range of the application device is in general smaller than the size of the target surface, in particular at least of the size or preferably less.

The application device can comprise a user-guidance unit built in such a way, to guide the relocation of the application device according to the global referencing while the relocation of the application device from one of the tiles location to another.

The present invention also relates to a method for applying a desired graphical application by an application system with an application device and an external referencing device. The applying of a desired pattern onto a target surface, in particular with paint onto a large area freeform target surface, is done with a positioning of at least one nozzle for expelling paint onto the target surface with respect to a base of the application device by a driving unit in at least two dimensions. By the positioning, an expelling aim of the nozzle onto the target surface is adjusted within an application range, which is defined as an area within which the nozzle is positionable by the driving unit. At least one trackable optical feature is comprised at the base or frame structure of the graphical application device.

At the graphical application device, a local referencing of the nozzle with respect to a visual feature by imaging the target surface is done by a local camera directed towards the target surface, in particular wherein the positioning of the nozzle also positions the local camera. The local referencing can be done by image recognition of the visual feature in an image from the local camera, wherein the visual feature can preferably be a previously applied section of the desired pattern.

A controlling of the positioning of the driving unit and the expelling of the nozzle is done by a controller according to an actual position of the nozzle and the desired pattern, in such a way to achieve an application of the desired pattern on the target surface, for example with a material like paint or printing ink expelled by the nozzle.

A global referencing of the base of the application device with respect to the target surface is done by an external referencing device as a surveying instrument located remote from the graphical application device. The global referencing is done according to the trackable optical feature of the application device and in at least three degrees of freedom, in particular in at least five degrees of freedom.

As the desired pattern is larger than the device's application range, a splitting of the desired pattern into multiple tiles is done, so that the tiles are fitting within the application range. The application of the tiles is done subsequently by stepwise relocating the graphical application device with respect to the target surface.

According to the method, the application of the desired pattern is done with a primary aligning of the application range for an actual tile to be applied with respect to the target object, which is based on the global referencing combined with a fine-aligning of the actual tile to a previously applied tile by the positioning of the nozzle within the application range, which is based on the local referencing.

A controlling of the positioning and expelling of the nozzle is done with a combining of the global referencing, the local referencing and the desired pattern to be applied at a desired location on the target surface. The controlling coordinates the moving and the expelling of the nozzle means, in order to achieve the desired pattern on the target surface at the desired global coordinates on the target surface and with an accurate alignment of the tiles according to the local referencing.

In an example of an embodiment, an arranging of the application device with respect to the target surface for the application of each of the tiles is controlled according to the global referencing and the application and movement of the nozzle within the application range of the application device is controlled according to the global referencing and by taking into account the local referencing, in particular with taking into account one ore more previously applied tiles surveyed according to the local referencing.

Therein, the application can be done with a scaling and/or distortion of the actual tile in order to achieve a match of the outline of the actual tile with borders of one or more previous applied tiles, determined by the local referencing and in accordance with the global referencing. Furthermore, a transforming of a flat 2D image to be applied as desired pattern to a free form 3D shape of the target surface can be done, in such a way that desired pattern appears undistorted on the non-flat, freeform target surface.

The local referencing can be done with a digital image processing of images taken by the local camera, wherein at least one of the tiles which has been previously applied is determined according to structural features in the image if the local camera, in particular according to their outline, contrast faces, colour separation, high pass or low pass filtering, feature extraction, etc. According to the thereby determined local referencing, the one of the tiles to be actually applied can be modified in order to fulfil requirements of the global and the local referencing, for example by positioning, shifting, rotating and/or scaling of the tile within the present application range of the application device.

The applying of the desired pattern can also be done with a 3D topography onto the target surface as described in detail below, wherein the desired pattern is topographically structured in such a way to improve aerodynamics or fluid resistance of the target surface, in particular wherein the topography or topology is a nano-structure or microstructure embodying a sharkskin-, lotus- or similar effect on the target surface, preferably with height changes below 5 cm, preferably below 1 cm or less.

Therein, a 3D shape of the target surface and an already present 3D topography on the target surface is determined by the local referencing and a controlling of the application is done in such a way that the applied surface structure is smooth and seamless, so that aerodynamically non optimal transitions are avoided and the resulting surface structure is (quasi-) endless.

The present invention also relates to a computer program product comprising program code stored on a machine-readable medium, for applying a desired pattern onto a target surface, wherein the applying is done by splitting the desired pattern into multiple tiles. The program controls the applying according to an external global referencing of an application device with respect to the target surface in combination with a local referencing of a to be applied of the tiles with respect to a previously applied of the tiles, in particular when the program is executed on a graphical application device according to the present invention.

According to the present invention, the expelling and/or positioning of the nozzle is controlled according to the local coordinates in view of the global coordinates. For example, coordinates as spatial referencing data from the local referencing and from the global referencing are combined to control the expelling of the nozzle means, wherein the local referencing is ensuring an exact matching of the tiles to each other and the global referencing ensures desired location of the tiles on the target object, so that the a target surface and/or desired pattern being much larger than the application range of the application device, in particular more than five times, can be seamlessly applied at the desired location on the target.

In particular, overlaps and/or edges of a pattern which is applied by masking or by foil are resulting in micro-steps on the surface. Such an uneven, non-smooth feature on the surface of e.g. an aeroplane is not favourable in view of aerodynamics, in particular if the feature is not specially designed for aerodynamic purposes.

A 3D application by a nozzle of an application device according to the present invention can be used to compensate, for example fill, smoothen or equalize minor inaccuracies in the surface topography. Those can be slight dents, drilling wholes, heads of screws or rivets, etc. In prior art—if done at all—those inaccuracies had to be filled with priming material and sandpapered in an additional step. According to the now presented special aspect of the present invention, this can be done in the same step by the same device as the application of a protective or decorative surface coating according to a desired pattern. In the 3D application, height differences can be achieved or compensated by expelling more material or increasing the expelling time at locations where greater application height is required. Another alternative for 3D applications is to build up the 3D-topography by multiple layers of material on the target surface.

As recent research in the direction of specially designed surface structures to improve aerodynamics (or fluid resistance in fluids)—the so called sharkskin-effect—achieved promising results and such micro-structuring of surfaces of vehicles can be an important factor in the reduction of fuel consumption, achieving higher speeds or protecting the surface from environmental influences, e.g. dirt, water, ice, etc. Practical testing on aircrafts already proved such.

This is a particular challenge in the painting and decoration of transportation vehicles, as the painting process of the surface produces the most outer layer of the vehicle, which is also responsible for such micro structuring effects. In an advanced embodiment of the present invention, it is therefore not only an object to achieve an accurate decoration of the vehicle according to the desired pattern, but also to thereby achieve a defined surface structure, preferably being seamless over the whole outer hull of the vehicle in a way to achieve the desired effect like optimized aerodynamics. Therefore, not only a flat spraying or inkjet-application on the surface is done, but the process is more like a 3D printing of microstructures in height, for achieving not only the desired colour and surface protection, but also an improved topography structure on the vehicles skin. Examples of such favourable skin-structures can for example be found in U.S. Pat. No. 5,848,769, EP 1 578 600, WO 2011/124318 or recent research papers related to the art of sharkskin-effect, for example from the IFAM at the German Fraunhofer Intitut.

According to this aspect of the present invention, riblet effects similar to those of a sharkskin can be applied by the nozzle of the application device by expelling such nano-structures or microstructures directly onto the target surface, in particular wherein the local referencing can be used to achieve a seamless coverage of a large area free form surface, even if the topography is applied stepwise in multiple tiles. Beside the sharkskin-topography, also so called lotus-effect coatings or other super hydrophobic surface topographies are known and can be applied according to this aspect of the present invention.

The third dimension perpendicular to the surface is therein flattish in comparison to the target surface dimensions, for example a few millimeters of even below one millimeter, but still comprises a desired topography pattern. Therein, not only the alignment of the decorative aspects has to be precisely positioned with respect to a previously applied section of the surface, but also the topography has to be matched to achieve a seamless transition, which is required to achieve the desired effect in an optimized manner. This is particular true for non-flat freeform surfaces, which are common on the hulls of vehicles. A global referencing alone is in general not sufficient to achieve such, as its positional accuracy is too low to achieve a seamless topographical pattern. Therefore, the local referencing in this embodiment takes not only advantage of a flat image processing for aligning a graphical pattern with respect to a previously applied part of the pattern to avoid gaps or overlaps, but takes into account the 3D structure of the surface for aligning the 3D structure of the previous application with the actual application. This can for example be achieved by a camera system with a structured light illumination or by a surface topography determination based on shadowing effects achieved in different defined target illumination situations. Also, a multiple camera approach, a RIM-Camera, 3D-Flash-LIDAR, laser scanning, etc. can be used locally, next to the expelling system for achieving such. For the local referencing of only flat graphical applications as discussed above, a simple one dimensional or two dimensional camera can be sufficient.

In this surface structuring technology, it is not the scope to achieve a flat and smooth surface coverage with a texture, but to apply a 3D structure onto the surface to achieve the desired topographies. This is done by expelling different amounts of the spattering material at different locations onto the surface to achieve the desired 3D structure. There can be a dedicated application material for building up the topographies, which is the—in the same process covered by a layer of desired colour. In another embodiment, the 3D structure can be established by the same material which also colours the surface, but also an application of the topographies by a transparent topographical layer can be done.

The above mentioned shark-skin application could also be considered as a stand alone invention, independent from the referencing of the application device and might be done without the aspect of global referencing, although latter can be helpful for the application as discussed above. For example by a device and method for improving aerodynamics, fluid resistance and/or dirt repellence of the outer surface of a vehicle, with an application device comprising a nozzle for expelling material, which nozzle is positionable with respect to the application device, and a local referencing system for referencing an actual application to a previous application, wherein the device is built in such a way to apply a desired 3D topography in multiple, subsequently applied tiled, onto the vehicles outer surface with a microstructure, in particular with a sharkskin- or lotus-topology, wherein the micro-structure has a seamless topography over the multiple tiles by the stringing together the 3D structures of the tiles according to the local referencing. The application device can optionally also be globally reference in position and orientation with respect to the vehicle by a remote surveying instrument.

BRIEF DESCRIPTION OF THE DRAWINGS

The method according to the invention and the devices and setup according to the invention are described or explained in more detail below, purely by way of example, with reference to working examples shown schematically in the drawings. Specifically.

FIG. 8 shows a side and front view of a first exemplary embodiment of a graphical application system according to the present invention in a hangar;

FIG. 9 shows a side and front view of a second exemplary embodiment of a graphical application system according to the present invention in a hangar;

FIG. 10 shows a side and front view of a third exemplary embodiment of a graphical application system according to the present invention in a hangar;

FIG. 11 shows an example of a desired topography application onto a target surface with a graphical application system according to the present invention, applying a sharkskin to a hull.

DETAILED DESCRIPTION

The diagrams of the figures should not be considered as being drawn to scale. The same reference signs are used for the same or functionally equivalent features throughout the figures.

Figure 1:
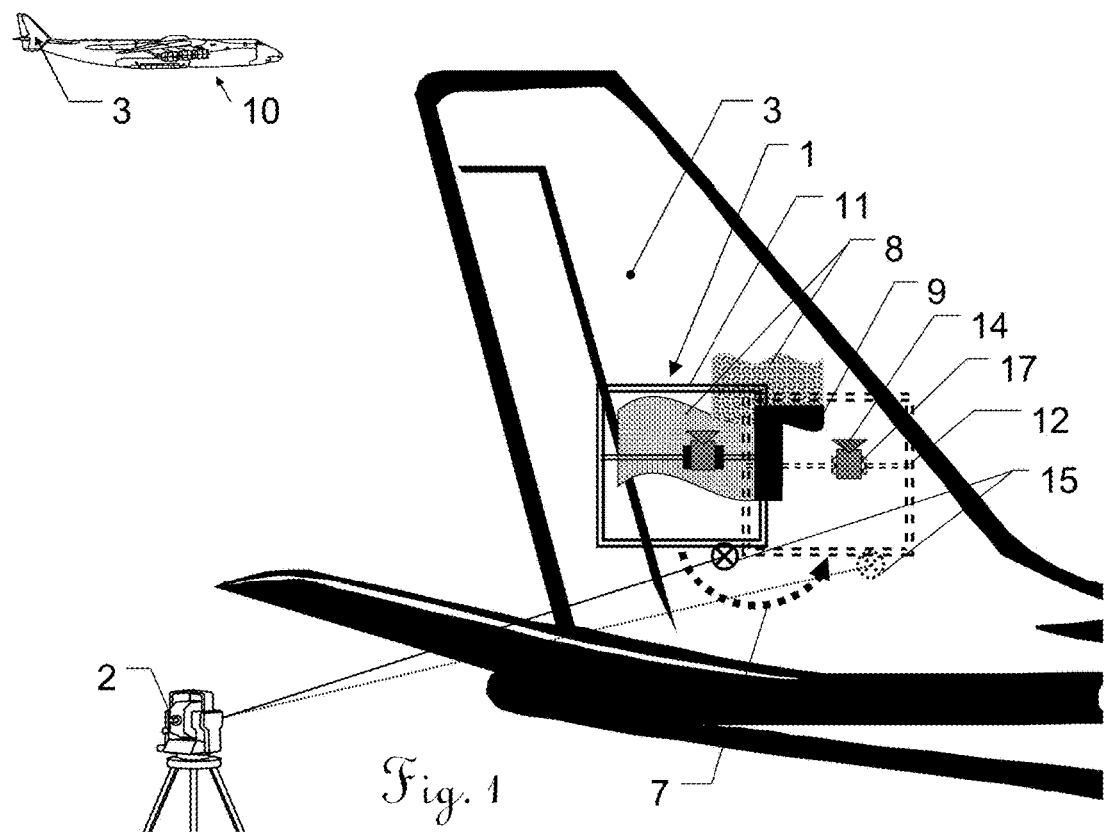
FIG. 1 shows an example of a possible embodiment of a graphical application system according to the invention which comprises an application device with a local referencing camera and a remote referencing device.

FIG. 1 illustrates an abstracted view of an embodiment of a graphical application system according to the invention, which comprises an applicator or graphical application device 1 and a referencing device 2 located externally from the application device 1. In the example of the shown setup, the application device 1 is used for applying a desired pattern 5 onto a vehicle 10 or more in particular onto a tail-fin of an aeroplane as a large area free form target surface 3, to which the desired pattern 5 has to be applied.

The graphical application device 1 comprises a nozzle 17 for expelling spattering material, for example paint, onto the target surface 3. This nozzle 17 or a set of such nozzles 17 is can be comprised in a printing head which is positionable within a base structure 11 of the application device 1, so that the expelling aim of the printing heads 17 nozzle with respect to the target surface 3 can be adjusted within an application range of the application device 1, which is defined thereby.

There is a local referencing of nozzle 17 with respect to the target 3, that is done by a local camera 14 with it's field of view directed toward the target surface 3. With the camera 14, a (for the camera) visual feature 15 in the target surface 3 can be referenced, in particular wherein the visual feature 15 can be a previously applied part or section of the desired pattern 5.

To achieve the application of the desired pattern 5 on the target surface 3 there is a controller 4 (e.g. a computation unit, a microprocessor, etc.) which controls the positioning of the driving unit 12 and the expelling of the nozzle 17 in such a way that the desired pattern 5 will be applied to the target surface 3. The controller 4 can be embodied at the application device 1, at the external referencing device 2, as a separate controller devices or as a distributed controller system.

Beside the application device 1, there is also an external referencing device 2 as a surveying instrument located remote from the application device 1, which is a surveying device for a global referencing of the application device 1 with respect to the target surface 3 according to at least one optical feature 15 of the application device 1. The optical feature 15 can be embodied by or attached to the application device 1. The application device 1 can also have more than one of such optical features 15 for the global referencing. The global referencing is done contactless, by optical means in at least three degrees of freedom, preferably in five or six degrees of freedom.

In many instances, an application of paint, printing ink or powder to large objects such as walls, industrial structures, manufactured goods like car bodies, large machine parts, aircrafts, vessels, busses, etc., as target surfaces 3 can not be done in one singe application step. Therefore, the desired graphical pattern 5—for example an image and/or text—is applied sequently by splitting the desired pattern 5 into multiple sections or tiles 8,9, which are mosaiced or fitted (also referred to as stitched) together to result in the overall pattern 5. The size of the tiles 8,9 can be dependent on many factors, one of the most important is the application device's application range 13, which can be covered by the movement of the nozzle 17 with respect to the device's base 11 without a relocation of the device's base 11. Also, the shape of the target surface 3, a position and size of a working stage, drying conditions of the already applied sections of the pattern 5, the overall size of the desired pattern 5, etc. can influence the size, the partitioning and the application order of the tiles 8,9, the desired pattern 5 is split into. Further, advantageous sections or structures within the desired pattern 5, like single letters, words, graphical items or areas to be applied with the same colour, etc. can influence the choice of the segmentation of the desired pattern 5 and the tile-sizes. Therefore, the tiles 8,9 can also have different shapes, they must not necessarily have rectangular, but can also have polygonal outlines. It is also not required for all the tiles 8,9 to use the full application range 13 of the application device 1, which means that at least some of the tiles 8,9 can also be smaller than the application range 13.

For the application of material onto the target 3 according to data comprising information of the desired pattern 5, a spatial referencing of the application device 1 with respect to the target surface 3 has to be established. Especially in case of targets 10 with large scales, a spatial referencing of the application over the whole range of the target is required to achieve such. Non-flat (3D) target surfaces 3 are a further challenge, as well as sudden interruptions on the target surface 3, for example surfaces 3 to be painted which comprise cables or pipes, or bodies of vehicles 10—like aeroplane-hulls—comprising windows or functional and movable equipment which must be excluded from painting, as the paint could cause malfunction.

In prior art, it was an important and time consuming preparative task to mask the target surface 3 so that only the desired areas remain uncovered for the following application process. In semi automated setups like in U.S. Pat. No. 7,922,272 it was the main preparative task to fixate the applicator against the target at an exact spatial reference. The thereby fixed guide rails of prior art are designed to provide a defined reference for the application device with respect to the target surface 3, for providing a predefined mechanically fixed and known position, orientation and distance of the applicator to the target. The application accuracy is therein pre defined by the rigid mechanical link of target and application device, which provides guidance for the applicator. A non-exact mounting of the guides for the applicator on the target surface results in an inaccurate position or orientation of the applied pattern on the target surface, in particular with respect to the target surface itself or with respect to previously applied part of the desired pattern.

The controller 4 can be built as computation means which can calculate an actual or forecasted application spot, as the actual of forecasted application area on the target surface 3 which will be hit by the expelling of the nozzle 17. The application spot can be adjusted by changing the characteristics of expelling of the nozzle 17 in such a way that the target surface 3 will be spattered according to the desired pattern 5. The application spot is thereby primarily dependent on the global spatial reference of the application device 1, the local referencing of the nozzle 17 relative to the target surface 3 and/or previous applications as well as a set of characteristics of the expelling of the nozzle 17. Such characteristics of the expelling of the material by the nozzle 17 can for example be an expelling direction, divergence, pressure, speed, material rate, etc. some of which can be fixed as well as variably controlled by a nozzle control mechanism.

In a simple embodiment, an on/off control is used, but there are many advanced methods known to influence the expelling, in particular in the technical area of ink-jet printing or airbrushes. For providing the application material to be ejected by the nozzle 17, the application device 1 can comprise a material supply which can be linked to one ore more internal or external material tanks. The application device 1 can also be equipped with an additional, dedicated nozzle 17 for sandblasting, for a preparation of the target surface 3 in advance of applying the desired pattern 5 by a single device 1.

The application device 1, its controller 4 or an associated computation means can comprise a data storage wherein a progress history of already applied parts of the desired pattern 5 is stored, preferably online during the application. The storage can also comprise the desired spattering data 5, which can be stored as a spatially dependent desired pattern to be applied to the target surface 3. The desired pattern 5 to be applied to the target surface 3 can be represented by a digital CAD like design of the pattern, a graphical image in pixel or vector format, texts with font and size information, etc. The desired pattern 5 data can be comprised in a storage, which can be embodied as a fixed installed memory means, as a slot for receiving a memory card, USB-Stick or the like but it can also be accessible by a wired or wireless network or cloud storage.

By digital image processing of an image from the local camera 14, the position and orientation of the expelling aim of the nozzle 17 with respect to a visual feature which is visible within the view of the camera 14 can be evaluated, in particular with respect to previous applications as visual features. The term "visible" in this case means visible for the local camera 14, and not necessarily for the human eye. For example not only the visible spectral range, but also the IR or UV range can be used. In addition, also natural optical features at the target surface 3 can be used as additional visual features, for example faces of high contrast, edges, corners, textures, seams, joints, screws, bolts, etc., in particular if their position can be used as known reference or if they define relevant references for the application, for example borders or omissions of the desired pattern 5 on the target surface 3, which have to be taken into account according to their realisation and not their theoretical position which might differ.

Referencing by image processing, e.g. by an identification and matching of visual features is a well known in the art of digital image processing. Thereby the picture coordinates of the visual features in the image can be determined in pixels, and preferably also in sub-pixel resolution. According to those picture coordinates, the referencing information can be gathered. To overcome possible geometrical image distortions of the camera and/or its optics, there are camera calibration methods known. Thereby a transformation of object-points to camera image points can be calibrated and modelled. If such a camera calibration is known, additionally, the appearing size of a known geometry of the visual feature in a camera image can be used as a source of information, in particular if the feature's shape and preferably also its dimensions are known—which is in general the case for a previously applied tiles 8 of the desired pattern 5.

If there are other visual features than an already applied tile 8 of the desired pattern 5 in or around the application range 13 at the target surface 3, whereto a geometrical fit of the desired pattern 5 is required, for example some edge or corner of the target surface 3, the local referencing comes into account for achieving the therein required accuracy, in particular if its referencing accuracy is higher than the one achievable by the global referencing. Therefore, the local referencing takes place directly with respect to the visual feature of the target surface 3, but still the global referencing is also taken into account.

Besides the local referencing, the local camera 14 at the application device 1 can for example also be used to determine the type or colour of the target surface 3. There can also be a light source for the local camera 14 for providing a defined illumination of the field of view of the camera 14, in particular wherein the light source emits a defined and known optical spectrum in order to facilitate an unambiguous identification of colours in the image of the camera 14.

The application device 1 according to the invention is globally referenced from an external surveying device as external referencing device 2 in order to determine the application device's position an orientation. As the application device 1 is spatially referenced by the external surveying device, a predefined and well aligned direct mechanical link from the application device 1 to the target surface 3 is not required. This allows more freedom in operation and an establishment of a direct attachment of the device 1 to the target 3 can even be avoided at all. For example, this allows a placement of the application device 1 on a movable working platform without establishing a direct physical contact to the object with the target surface 3, or to position the platform with high accuracy at a defined location.

According to this global referencing, the application device's 1 position with respect to the target surface 3 is known. According to the present invention it is in general not necessary to determine this global position with such a high accuracy, that the global position information has the same resolution as the resolution of the artwork to be applied, for example in the range of the dots per inch count of an application by an inkjet-like application device 1.

For example, the global referencing can have an accuracy of some millimeters, whereas the accuracy of an applied pattern 5 and in particular of the stitching of subsequently applied sections 8,9 of the pattern is below millimeter range, for example a few ten or hundred microns only. This high accuracy, is, where it is required as for example for a split of the desired pattern 5 into multiple subsequently applied tiles 8,9, established by the local referencing which takes place at the application device 1 and which is directed towards the target surface 3, in particular towards a possibly already applied section 8 of the desired pattern 5.

The alignment of the to be applied pattern 5 on the target surface 3 is, in particular compared to the much larger target surface 3, reasonably accurate by the global referencing, even if it is not as accurate as the local referencing. For example, a placement of a "NO STEP" marking on an aeroplane-wing is well placed within a few millimeters or even centimeters. So the application device 1 can be located with respect to the desired area on the target vehicle 10 by use of the global referencing of the application device 1 and the application can be executed by the device 1 within its application range 13. If the markings size is small enough to fit within the application range 13, the application can be done at once in a single tile, without splitting the desired pattern 5 into multiple tiles.

The application device 1 is built in such a way to apply the desired pattern 5, with a primary alignment of the application range 13, respectively an actual tile 9 to be applied, with respect to the target surface 3 and/or with respect to a previous application range, that is determined by the global referencing and with a fine-alignment of the actual tile 9 to one or more previously applied tiles 8 by the positioning of the nozzle 17 within the application range 13 that is determined by the local referencing.

Figure 2:
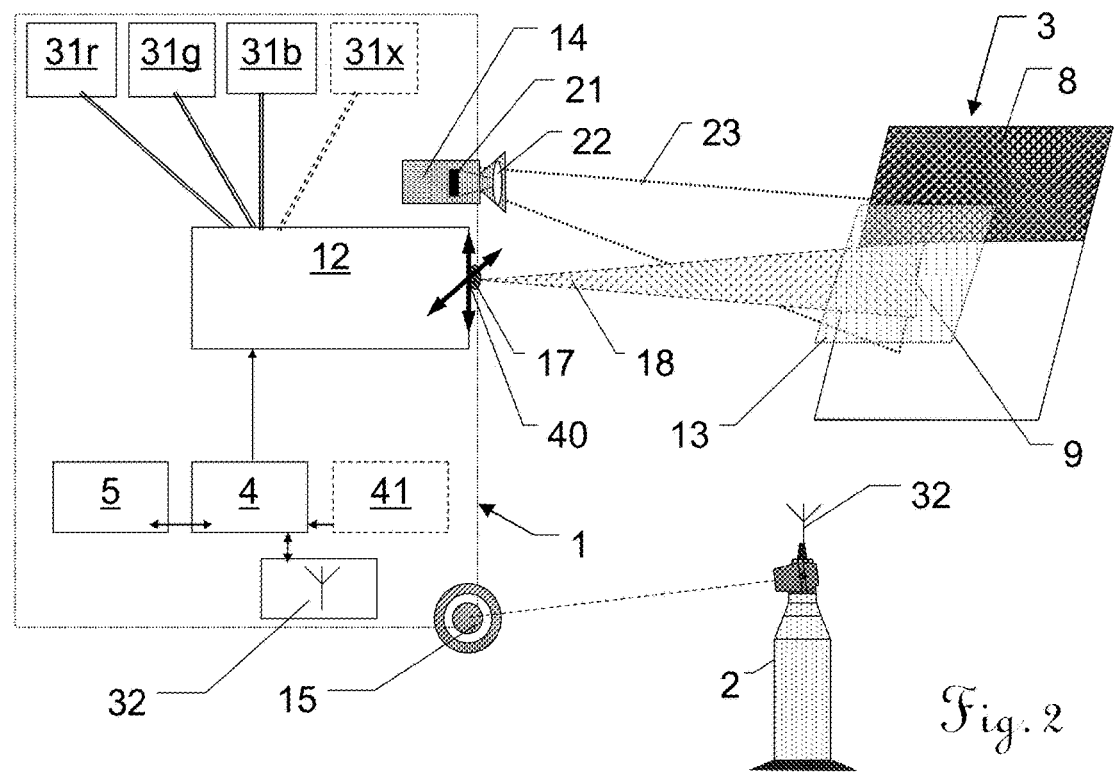
FIG. 2 shows an example of a possible embodiment of a graphical application system according to the invention in a simplified block diagram.

FIG. 2 shows another abstracted view of an embodiment of graphical application system 1 according to the invention. The nozzle means 17 in this figure comprises a mixing of multiple spattering materials. In the illustrated example, there are three spattering material supplies 31r, 31g, 31b representing red, green and blue paint-materials supplied from the corresponding storages. The different spattering materials can be mixed inside of the nozzle means 17 to a desired composition controlled by the controller 4, for example to achieve the desired colour, which will then be expelled by the nozzle 17. Shown in dashed lines there is also an additional material supply 31x, but the number of material supplies can—starting from one—vary dependent on the embodiment of the application device 1 and/or application task.

The applied material can for example be paint, finish, lacquer, varnish, ink and powder, wax, plastics, silicone, etc. The material is supplied to the nozzle 17 from a material supply which can be embodied as a link to a tank or container located at the application device 1 or as a pipeline from an external storage.

The application device 1 can comprise a printing head with a single or multiple nozzles 17, e.g. aligned in rows or spraying bars. The controller 4 can adjust each single nozzle 17 in a short reaction time. In other embodiments, the nozzle characteristics can also be adjusted for multiple nozzles by a single actuator. To reduce the influence of the remaining reaction time, the control-algorithm for the nozzles 17 can comprise a prediction of the reaction time. The nozzles 17 can work like a magnified variant of an inkjet printer to apply any colour by a set of primary colours like RGB, CMYK, HSV, etc., which may be extended by some special colours like black and white, or spot colours like gold, silver, clear coatings, etc.

An embodiment of the application device 1 can be built in such a way that the target surface 3 is spattered by one or more colour or material 18, wherein different colours can be:
  mixed by dithering or spattering a dot-matrix of spots of material of a basic set of different colours or materials from the material supply,
  mixed online, inside or in front of the nozzle means or by overlaying spots of different material on the target surface 3, out of a basic set of different materials or
  mixed offline, with pre-mixed colour or material being supplied from the material supply.

An additional mixing of solvent to achieve a desired viscosity of the material can also be done. Furthermore, an ejection of pure solvent can be used for cleaning purposes of the target surface 3, of the application device 1 or of both of them. If the applied material is curable by certain environmental influences like ultraviolet radiation or heat, the application device can be equipped with a source for such, e.g. an UV-lamp or infrared radiator, which can also be embodied by a laser-source which—at least roughly—covers only the spot which is presently being applied or had just recently been applied.

There are nozzles 17 for material ejection available on the market, which allow spraying a defined spot of material in an expelling direction with a spot diameter or size on the target surface 3 of less than one centimeter from a distance to target which is greater than ten centimeters. The actual sizes of the spots can be adjusted not only by varying the target distance, but also by adjusting the expelling-characteristics of the nozzle 17 to influence the expelling divergence and shape of the spot on the target surface 3. By such an adjustment, even in case of varying application distances, it is possible to achieve a desired spot size on the target surface 3, which is in particular advantageous for non-flat target surfaces 3. The spots can be ejected with high repetition rates of hundreds of spots per second or even more. Such printing heads and their nozzle systems 17 also allow an application of a desired pattern 5 without masking the target surface 3, even when differently coloured target sections are aligned next to each other. The local referencing can take account of their alignment as the application process can for example be further observed by the local referencing camera 14 at the application device 1, to verify the application progress and to compare it with the desired pattern 5.

In an offline planning of an application according to the present invention, a planning tool can support the operator in preparing the division of the desired pattern 5 into tiles 8,9 in advance and also simulate the application procedure. The planning can be executed on a remote computer or be comprised within the application device 1 with according input and output means for user-interaction. The planning can be done in advance of the work based on already available digital data, such as a 3D model, CAD data or by surface model information gathered by the local and/or external referencing.

In an online planning of an application according to the present invention, the division of the desired pattern 5 into tiles 8,9 is done just in time during work. Since there is a global referencing of the application device 1, the application order must not necessarily following a predefined sequence of desired relocations of the application device 1, but can also be done by arbitrary or random relocations. Also, combinations of the above mentioned online and offline planning can be used.

As the external referencing device 2 is located remote from the application device 1, a (in this embodiment) wireless communication link 32 is established from the remote device 2 to the controller 4 of the application device 1, which controls the application of the desired pattern 5. Preferably, a real-time communication is used, which allows handling dynamic movements. Optionally, potentially occurring communication and/or evaluation delays can—at least partially—be compensated by a prediction or a look-ahead.

The referencing information can be communicated from the external referencing device 2 to the application device 1, for example as position and orientation information. The communication can be done by wire or by wireless means and is preferably done in real-time or by the usage of a distributed clock system, for example in such a way the position and orientation values have unique timestamps which are equal at all of the communicating devices. In the shown example, the communication means 32 at the application device 1 and the external referencing device 2 are embodied for wireless data communication.

A combination of the global and/or the local referencing can also be used during the application process to verify that the target and/or a platform, on which the application device 1 is located, is not moved—as this can be caused by vibrations, swings, thermal deformations, settling effects, drifts, etc. Such inaccuracies can be determined and compensated in the application process according to the invention by a counter-shift of the to be applied pattern 5 by the driving unit 12, so that a fit of the desired pattern 5 is established without gaps or overlaps of the tiles 8,9.

In addition to the local referencing camera 14 an electronic distance measurement (EDM) device or laser rangefinder at the application device 1 can accurately determine the application distance to the target surface to adapt expelling characteristics of the nozzle 17 accordingly. There can also be a sensor for determining thickness of the paint on the target surface 3, preferably movable with the nozzle 17 and/or camera 14. Technologies for such a plating thickness determination sensors are well known in the art. Those additional means are illustrated by the optional block 41 in the figure.

Figure 3:
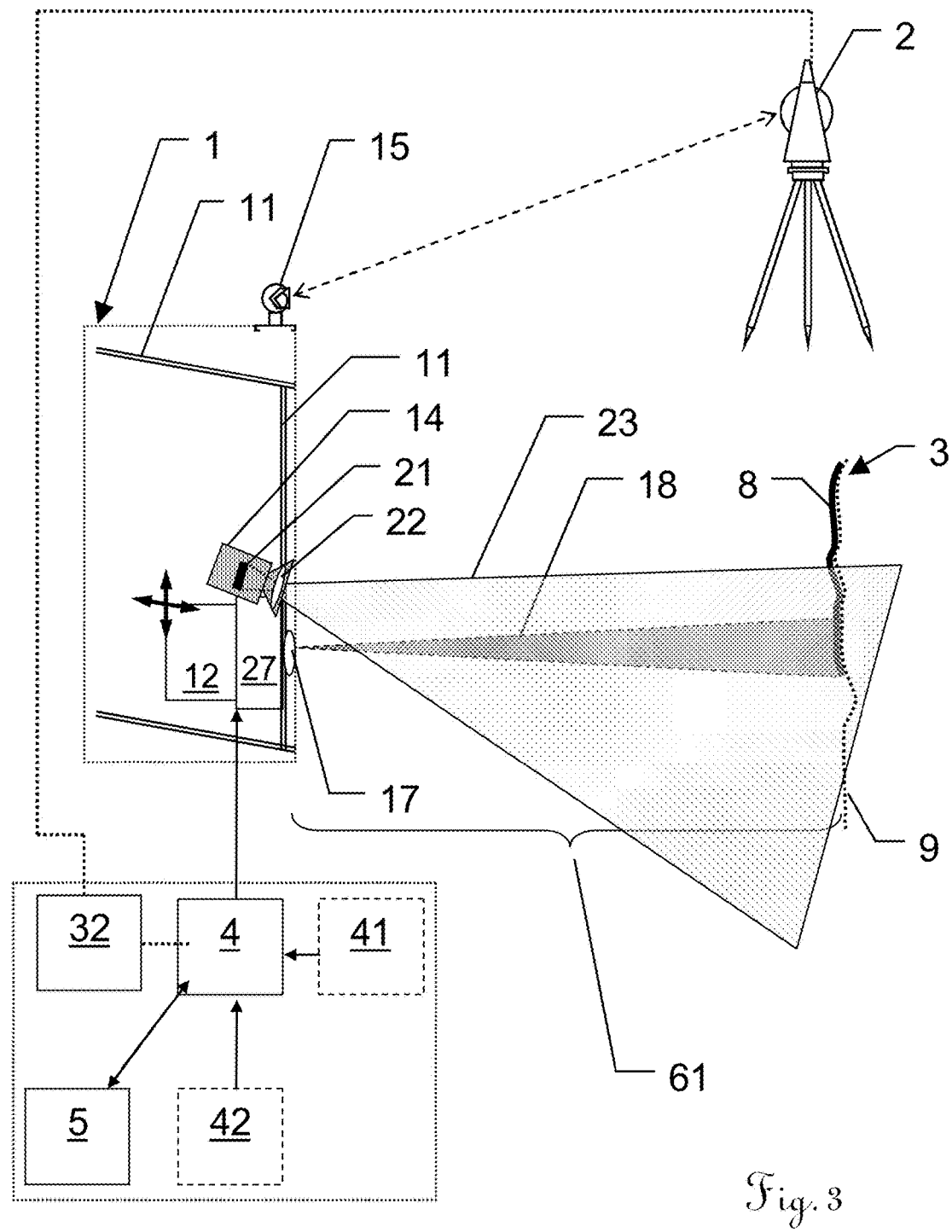
FIG. 3 shows a further example of another embodiment of a graphical application system according to the invention in a schematic diagram.

The exemplary embodiment of the graphical application system according to the invention shown in FIG. 3 establishes a communication link 32 for an exchange of referencing data, for example in form of position and orientation information, from the external device 2 to the application device 1. The external referencing device 2 is used for a global referencing of the application device 1 according to a trackable optical feature 15. The shown communication link 32 is a wired link, but it can also be embodied by a wireless link. The controller 4 of the application device 1 uses this information together with local referencing information determined by digital image processing of an image from the local referencing camera 14 to control a driving unit 12 for a printing head or nozzle unit 17 and the expelling of paint 18 by the nozzle unit 17 to a target surface 3, in order to apply a desired pattern 5, as stored in a memory unit, onto the target surface 3.

The at least one local camera 14 can be embodied with an image sensor, in particular with a one or two dimensional CMOS or CCD sensor array 21 for detecting optical radiation and a lens system 22, with a field of view 23 directed towards the target surface 3.

The controller 4 controls or regulates a control mechanism 27 for the nozzle 17 and can be embodied as a microcontroller, an embedded system, a personal computer or also in form of distributed system, for example with a basic computational unit at the application device which can establish a wired or wireless communication link to another computation means which has more capacity and performance such as a personal computer, laptop or workstation.

A memory unit can be comprises in or connected to application device 1, for example embodied as at least one storage such as a RAM, ROM, hard disk, memory-card, USB-Stick, or the like, which can be either fixed or removable or a combination of both. The storage is built in such a way to memorize data comprising information of the desired pattern 5, which can e.g. be a CAD drawing, vector graphics, a bitmap picture (compressed or uncompressed) and can further comprise additional three dimensional information. In case of a contoured, curved or uneven target surface 3, the desired pattern 5 can—beside a two or three dimensional artwork information itself—also comprise further information on the three dimensional fitting of the artwork on the object or vehicle 10 providing the target surface 3.

An embodiment of a application device 1 can for a example be equipped with an arrangement of multiple LEDs as active trackable optical features for global referencing, wherein the arrangement is built in such a way that the application device's 1 position and orientation can be determined uniquely, for example assisted by blinking codes, different colours, etc. In another embodiment, the trackable optical feature at the application device 1 can also be embodied by an arrangement of passive optical features like on or more geometrical objects of well defined shape and/or colour. The trackable optical features can also comprise fluorescent or retro reflective surfaces. For example, target marks similar to those known from surveying instruments, in particular adapted for the surveying instrument used as external referencing device 2.

The application device 1 can optionally be supported by an additional IMU 41 to determine the dynamics of movement and/or direction of gravity. This information can be combined with the spatial position and orientation measurement of the global and local referencing.

An embodiment of a graphical application system according to the invention can also comprise or can be linked to further environmental sensors 42 for determining the local environmental conditions such as temperature, wind speed, humidity, time, and other factors influencing the expelling and the drying conditions of the applied material 18. The environmental information gathered by those sensors 42 can be used by the controller 4 to command the nozzle control mechanism 27. Furthermore, there can be another or an additional sensor 42 for analyzing the application material, like determining its viscosity, flow rate, supply stock, etc. Also, the direction of gravity can be taken into account in the determination of desired expelling characteristics of the nozzle 17.

Figure 4:
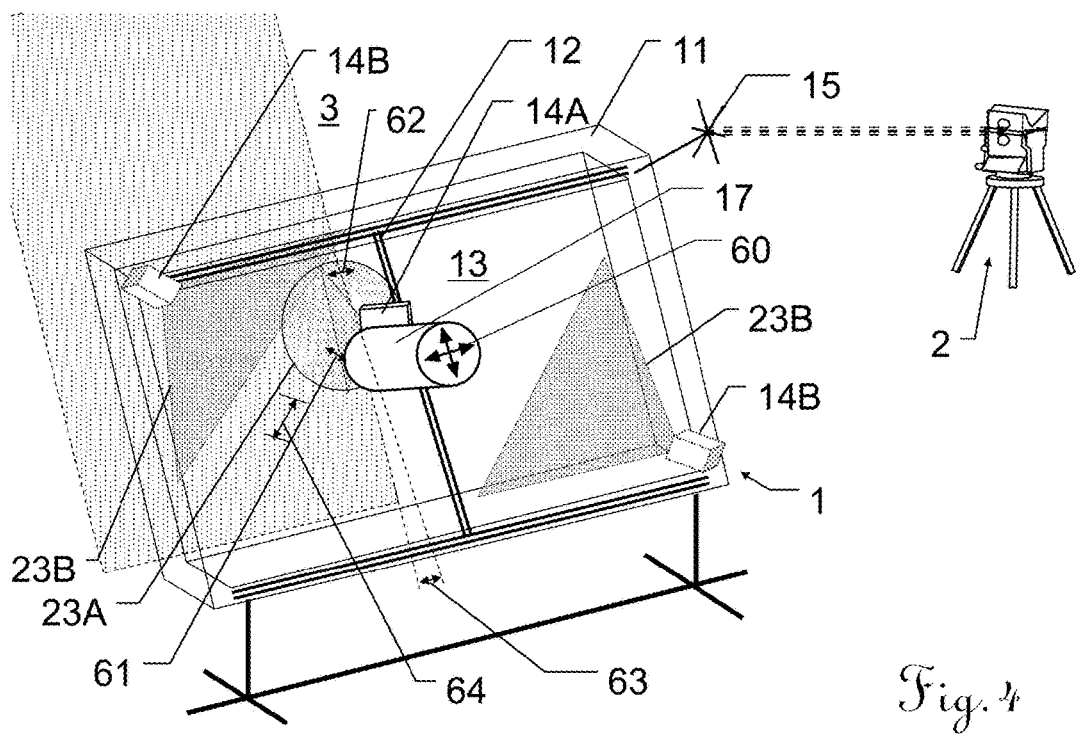
FIG. 4 shows an example of a possible usage of a graphical application system according to the invention.

In FIG. 4, there is an example of an embodiment of a graphical application system according to the invention. There is an application device 1 with trackable optical features 15 which allows a remotely located external referencing device 2, for example a laser tracker, to survey a position and orientation of the application device 1. The application device comprises a driving unit for moving one or multiple nozzles 17 with respect to a base structure 11 of the application device 1, so that an application range 13 of the application device 1 can be covered by the expelling of the nozzles 17. The nozzles 17 are movable in lateral direction of the desired pattern 5 to be applied (indicated by the arrows 60) and can also be movable perpendicular to the target surface 3, adjusting the distance 61 in-between the nozzles 17 and the target surface 3. Especially for curved or freeform target surfaces 3, the terms lateral and perpendicular have to be interpreted broadly, e.g. within a range approximately in this direction.

The application device 1 comprises also a local referencing camera 14A,14B with its field of view 23A,23B directed towards the target surface 3. The local camera 14A and its field of view 23A (as indicated by the circle drawn on target surface 3) can be embodied to be movable with the nozzles 17. The local camera 14B can also be embodied to at the base 11 with its field of view 23B directed towards the target surface 3, (as indicated by the triangles at the cameras 14B). In the Figure, both options for local cameras 14A,14B are illustrated, although one can be sufficient as well.

The local camera 14 captures an image of the target surface 3 and a local referencing to visual features at the target surface is established. Such a referencing can comprise target coordinate information such as the shown rotation 63 and/or the position 62 with respect to the visual feature, which can be an already applied section (e.g. one or multiple tiles) of the desired pattern 5. If the visual feature provides usable items, also a local scale 64 and/or a target distance 61 can be determined by the local referencing with the local cameras 14A and/or 14B.

The expelling of the nozzles 17 and the driving unit 12 are then controlled based on information from the global and the local referencing, in order to apply the desired pattern 5 on the target surface 3 in multiple, subsequently applied tiles, also with target surfaces 3 and/or desired patterns 5 being larger than the application range of the application device 1. Therein, the combination of a local and global referencing is more than a mere side by side usage of two principles. It is an advantageous combination of those principles which compensates the weaknesses of each principle to result in advantageous effects, allowing high quality application of graphical patterns e.g. to object with large surfaces with free for shape, such as aeroplanes, ships, etc.

In a special embodiment, a control mechanism can also fine-adjust in the direction of expelling or ejection from the nozzle 17, e.g. by tilting the nozzle 17 or by influencing the expelled jet of material in addition to the movement of the nozzle 17 by the driving mechanism 12. Dependent on the spatial orientation and knowledge about the already-applied areas 8 (e.g. by the local referencing) and still-to-be applied areas 9 on the target surface 3 (e.g. according to data defining the desired pattern 5), the controller 4 is capable of automatically deciding whether or not to release material (e.g. paint) to the presently targeted spot on the surface 3 by a certain nozzle 17.

In the shown embodiment, the application device 1 is built to be stationed on a movable working platform, but in another example, (shown below) it can also be built as a movable printing-box which can be—almost randomly placed on the target by a worker. The printing-box is surveyed by the referencing device 2 to achieve a global referencing, and—according to its reference with respect to the target—a desired tile of the desired pattern 5, which is inside the application range 13 of the printing-box is determined and prepared for application. Furthermore, the printing-box executes the local referencing by the camera 14A, 14B directed towards the target surface 3 and a digital image processing of the resulting image. Therein, visual features of the target surface, in particular already applied parts of the desired pattern 5, are identified and located. According to this local referencing an exact alignment of the desired tile can be established, without an exact fixation of the printing-box onto the target.

During the application of a single tile, the application device 1 can be temporarily fixed at the target e.g. by feet with suction cups, magnetic holders, sticky soles, etc.

Figure 5:
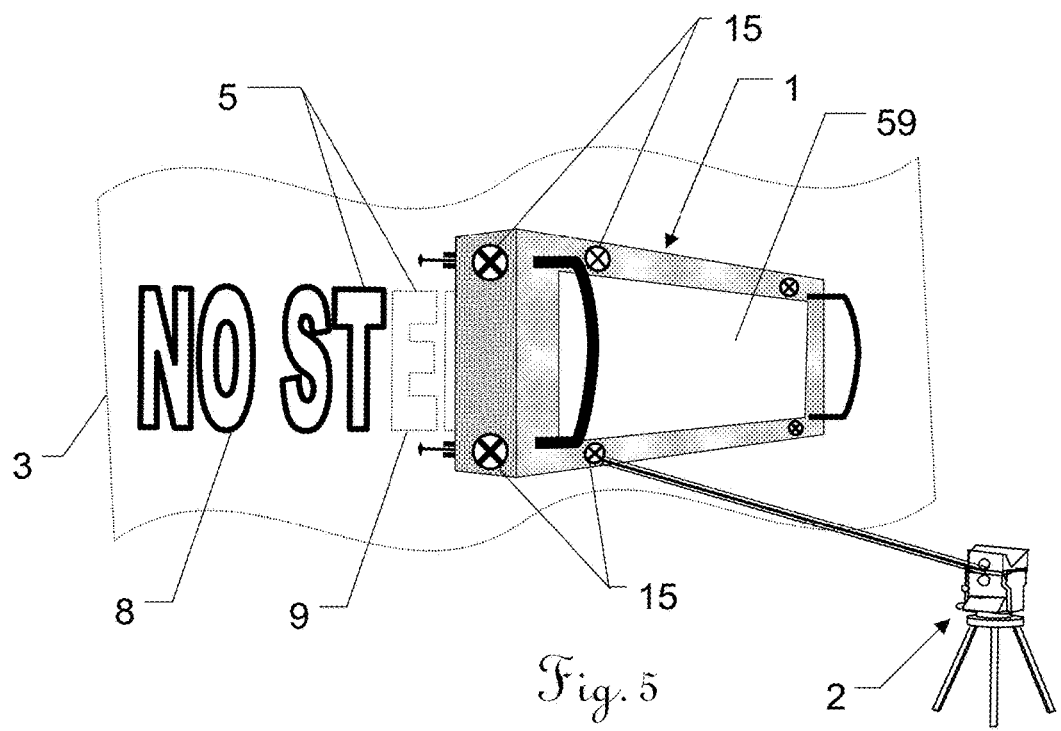
FIG. 5 shows an abstracted view of an embodiment of a system according to the invention.

FIG. 5 illustrates another exemplary embodiment of a graphical application system according to the invention, which comprises an application device 1 with a row or line of multiple nozzle means 17. The illustration shows the application of a desired pattern 5 on form of a lettering on a target surface 3. There is an already applied section 8 of the desired pattern 5 (drawn bold) and a to be applied section 9 of the desired pattern 5 (drawn dashed). Because the overall size of the desired pattern 5 extends the application range 13 of the application device 1, the application has to be done by splitting the desired pattern 5 into multiple tiles 8,9.

In the example of this embodiment, the desired pattern 5 is split in such a way, that each of the single letters is applied at once and is not separated into multiple tiles 8,9 (although the application range 13 would be big enough to also apply a part of an additional letter). For aligning the application device 1 and its application range 13 with respect to the target surface 3, the external global referencing device 2 is used to survey the application device 1 according to its trackable optical features 15, whereby the position and orientation of the application device 1 with respect to global coordinates of the target surface 3 can be determined. Thereby, the tiles 8,9 and letters can be aligned to each other, even if there is no visual feature of a previous application in the field of view 23 of the local referencing camera 14, by which a referencing of a present 9 to a previous application 8 can be established—which can for example be the case if the spacing of words or letters exceeds the application range 13. As shown, the application device 1 can be quipped with handles to be manually handled and with feet to be held against the target surface 3. In another embodiment, the application device 1 can be embodied to be stationed on a working platform or the like, which platform can be moved relative to the target surface 3 as discussed above.

In the example of this embodiment, the application device 1 can be just manually held onto the target surface 3. To gain advantageous visual features for the local referencing within the range of the local cameras view—such as edges or corners of the previously applied parts of the desired pattern 5 or other optical target features—the global referencing information can be used as user-guidance for the location of the application device 1, e.g. by indicating desirable locations or deviations thereof. Thereby, the user can be aided in placing the application device 1 at an advantageous for the to be done application 9 and the local referencing according to visual features at the target surface 3.

To interact with the device 1, e.g. to observe, select, arrange, modify, manipulate or even create and define the desired pattern 5, the application device 1 can comprises a human-machine interface (HMI) 59 which can, for example, comprise buttons, knobs, joysticks, dials, light indicators, displays, touch screens, etc.

The HMI 59 can also be used as a direction indication for user guidance, by which the user can be directionally guided in relocating the application device 1. The application device can be equipped with some simple symbol lamps for indicating the desired direction of movement to the operator. The desired movement can also be indicated by symbols on a screen or graphical display. It is also an option to overlay an outline of the presently to be applied tile or the application range (e.g. by a laser line projector or other optical projection means) onto the target surface 3. When the user aligned the application device 1 in a way that an alignment to one ore more previously applied tiles 8 are given, the local referencing can handle the fine adjustments and determines the details of the to be applied tiles 9, e.g. by cropping, rotating or slightly deforming the desired pattern to a to be applied tile 9, which fits with the application 8 already present on the target surface 3 as visual feature for the local referencing camera 14. Alternatively, an image of the local referencing camera 14 can be overlaid with the desired pattern 5 to be applied, based on the global referencing, and the resulting overlay can be presented to the user.

Figure 6:
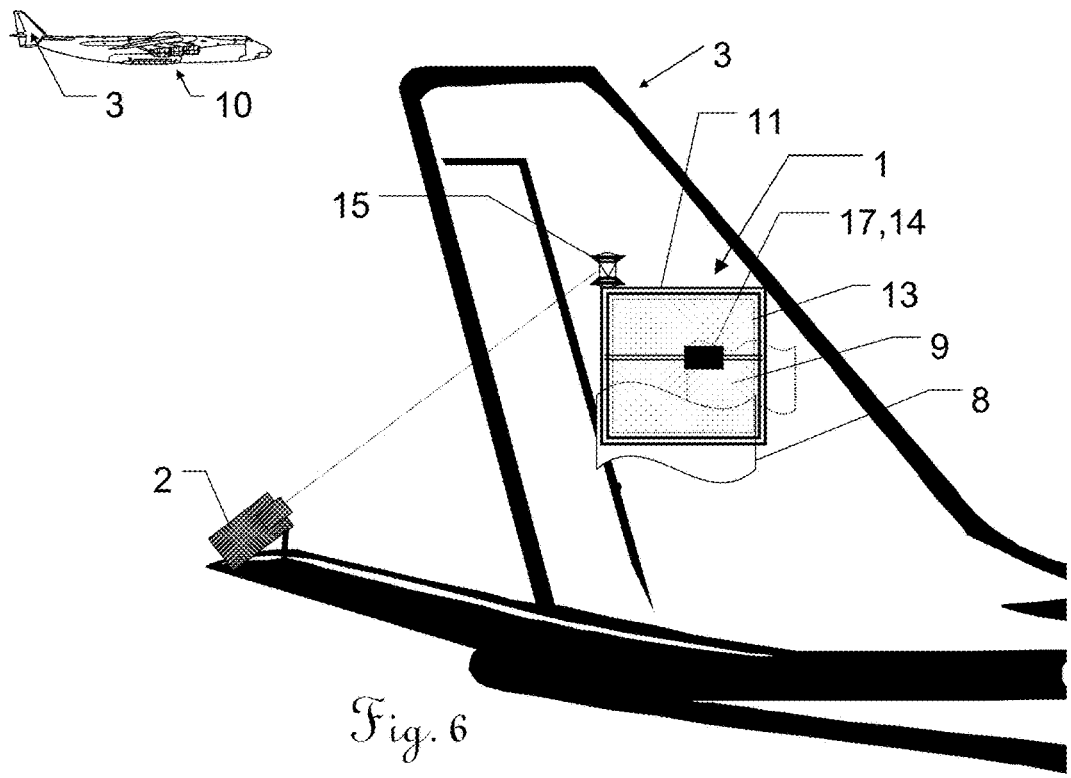
FIG. 6 shows an example for a graphical application system according to the invention for an application of a desired pattern onto an aeroplane.

FIG. 6 shows an embodiment of a graphical application system according to the invention with the task to apply a desired pattern 5 by multiple tiles 8,9 onto a tailfin of an aircraft as target surface 3. The application device 1 is spatially referenced by the global referencing device 2 located external or remote from the application device 1. For the referencing, the application device 1 or its base 11 is equipped with at least one trackable optical feature 15 for the global referencing device 2 to be contactless surveyed by optical means. The surveying information gained thereby are communicated in-between the devices 1 and 2.

Within the frame or base 11 of the application device 1 there is the printing head with one or multiple nozzles 17, which can be moved within the frame 11 in order to cover an application range 13 which can be targeted by the expelling of the nozzles 17.

The application device 1 also comprises a local referencing camera 14 which is built to spatially reference the expelling aim of the nozzles 17 to visual features at the target surface 3, such as previous applications of the nozzles 17, like the applied section 8 of the desired pattern 5.

Figure 7:
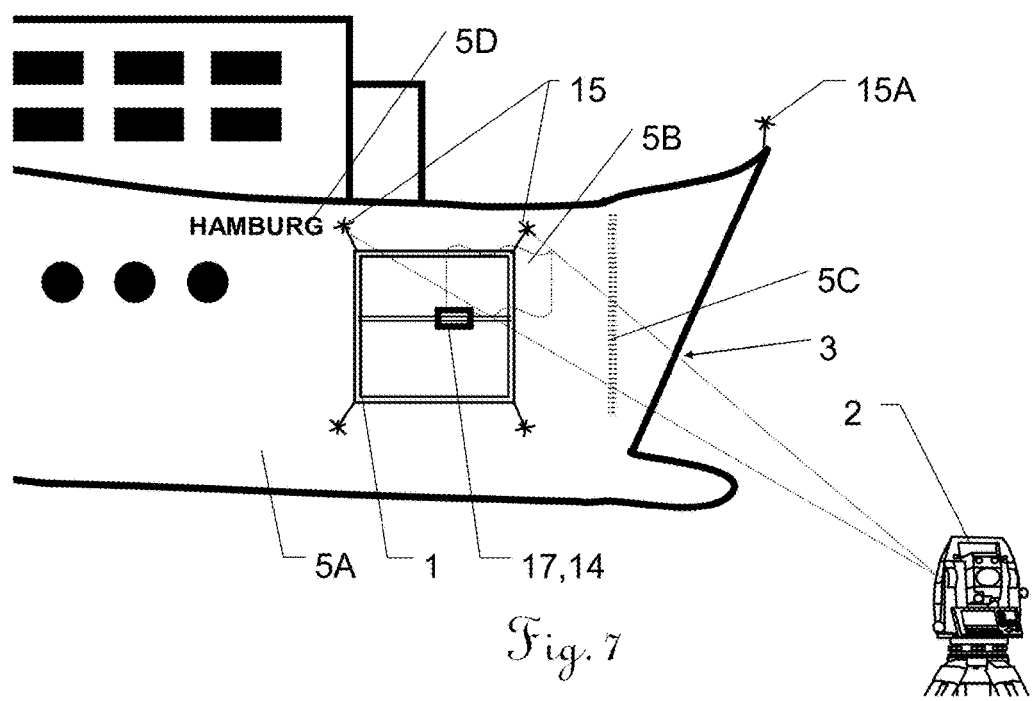
FIG. 7 shows an example for a graphical application system according to the invention for an application of a desired pattern onto a vessel.

The embodiment of the graphical application system which is shown in FIG. 7 is used for applying markings as desired application pattern data onto a curved surface of a vessel as target surface 3. The surface of the vessel is comparably larger than the coherent patterns like the shown flag 5B, the load indicator 5C or the ships name 5D. Nevertheless, the patterns 5B, 5C and 5D can be larger than the application range of the application device 1, wherefore the desired pattern 5 is applied subsequently in multiple tiles. The external referencing device 2 provides spatial information of the application device 1 (according to its trackable optical features) with respect to the vessel as the whole target surface 3. The local camera 14 references the position and/or orientation of the application nozzle 17 with respect to visual features of the target surface 3, in particular to provide accurate alignment of the nozzle's application to the visual features, especially to previously applied sections or tiles of the desired pattern 5.

In a special embodiment, also the whole outer hull of the vessel can be the target surface 3 for the application of the desired pattern 5A, which can be a flat, decorative graphical pattern or a 3D topographically structuring of the surface with additional technical functions as discussed above. In addition to the trackable optical features 15 of the application device 1, also the target surface 3 or the object comprising it, can be equipped with one or more additional trackable optical features 15A for the global referencing device 2 to gain additional information for the global referencing.

As shown in the example of FIG. 8, the graphical application system 1 according to the invention is used to apply a desired pattern 5 to the curved surface 3 of an aircraft body by the application device 1, with the local referencing camera 14 and the external referencing device 2 as discussed above. On the left hand side, the setup is shown in side view and on the right hand side, the same setup is shown in front view. The global referencing device 2 is stationed on ground and is optically surveying the application device 1 according to its optical feature 15 and providing global referencing data as spatial information of the application device 1.

The application device 1 is used on a movable platform 50 hanging from the ceiling of an aircraft hangar. In aircraft hangars or at dockyards, there are often working platforms hanging from the ceiling but also Bucket trucks, hydraladders, boom lifts other vehicles equipped with a (preferably motorized movable) scaffold can be used to reach a desired target area on large, free form target surface. Those movable gantries or the like are often manually controlled in their position and—if at all—are equipped with position measurement systems of very low accuracy in the range of some tens of cm or worse.

As the desired pattern 5 is larger than the application range 13 coverable by the nozzle 17 within the application device 1, the desired pattern 5 will be applied stepwise in multiple tiles 8,9. The location of the desired pattern 5, respectively its tiles 8,9 on the target surface 3 is determined according to information gathered by the global referencing device 2. In particular at the borders, where the tiles 8,9 have to be put together, the application is fine-adjusted according to information determined by the local referencing camera 14. This allows an exact application of the desired pattern 5, even if it is split into multiple tiles 8,9 which are sequentially applied without an exact mechanical guidance of the movement of the application device 1 from one tile to another. Therein, also deviations from the theoretically ideal positions of the application device 1 can be identified and compensated in the application process.

In FIG. 9 another example with a similar setup to the one of FIG. 8 is shown. The application device 1 is stationed or located on a gantry movable relative to the target, which is in this example mounted at a vehicle 51. As such a vehicle and its platform can in general be not considered to provide a fixed and solid spatial reference, an application from this basis would not provide the desired results. According to the present invention, the global referencing device 2 keeps track of such spatial deviations of the spatial reference of the application device 1, so that the deviations can be considered and compensated in the application process.

The printing head or nozzle system 17 that is movable within the application device's application range 13 can be adjusted to achieve such compensation by a counter movement of the driving unit 12 which is mobilizing the printing head in two or more dimensions with respect to the application device 1. Together with the printing head, there is also the local camera 14 moved, by which an exact alignment of the present application 9 with respect to visual features on the target surface 3 such as an already applied section 8 of the desired pattern 5. By the high spatial accuracy of the local referencing—which is better than the one achievable by the global referencing—the different tiles 8,9 or sections of the desired pattern 5 can be unfragmented during application to achieve the desired result. Nevertheless, the local refining alone could not guarantee correct alignment of the desired pattern 5 and its tiles 8,9 over the whole area of the target surface 3, wherefore the externally placed global referencing device 2 keeps track of the global application accuracy, preferably continuously or online during the application process. Therein, sight deviations can also be compensated by slight deformations of the actual tile of the desired pattern 5, in order to bring the local and global references into conformance—if the deviation can not be corrected otherwise.

In the example of FIG. 10, the target surface 3 is also on an aircraft vehicle 10, similar to the one of FIG. 8 or 9. Therein, a worker 55 on a boom lift 53 is holding the application device 1 against the target surface 3. For this task, she can be assisted by feet, suction cups, magnets, etc. as support between the application device 1 and the target surface. The worker 55 locates the application device 1 on the target surface, wherein she can be assisted by information from the global referencing device 2 which surveys the application device 1 from a remote location by at least one trackable optical feature 15 at the application device 1. Such assistance can be done as discussed above, for example by displaying movement information for the application device 1, according to which the application range 13 of the application device 1 can be at least approximately positioned at a desired location on the target surface 3. Further, fine adjustments of the location of the tile will be done by the driving unit 12, in particular by taking into account information from the local referencing camera 14.

Then the worker 55 starts the application and the nozzle applies an actual tile of the desired pattern 5, using information from the global referencing and local referencing information with respect to previous applications, if available. When finished, the worker 55 can manually move the application device 1 to a subsequent location, preferably guided according to the global referencing, so that the application range 13 will comprise borders of previous applications, where the desired pattern 5 will continue. Following this sequence, the desired pattern 5 will be built up subsequently, in accordance with the global and local referencing.

In FIG. 11, the example of a sharkskin application according to the abovementioned special aspect of the present invention onto a body of a vehicle 10 as target surface 3, in the shown embodiment to the body of a ship. There is the external referencing device 2 is surveying the application device 1 as discussed above. The desired pattern 5 of this embodiment comprises a three dimensional micro-structure for reducing drag in the water and/or reducing algal growth, for example the mentioned shark- or lotus-skin, but also other structures. Nevertheless, the desired pattern 5 can still comprise certain graphical elements such as the ships name as text 5D. For illustrative purposes, the 3D structure of the to be applied pattern 5 is not drawn to scale with respect to the other components but magnified.

The local referencing in this embodiment ensures a seamless transition of the micro-structure pattern in order to achieve the desired effect of the structure, even on curved sections of the target surface by adapting the application to match with already applied tiles of the application. The global referencing by the device 2 provides a reference with respect to global coordinates on the ship. The global reference can for example keep track of the application to avoid a summing up of inaccuracies, determine the placement of the application 5D and/or ensure an application of the desired micro-structure pattern according to the expected streamline of the water to achieve the desired effect by adapting the pattern and/or topology structure to the surface's shape. The application of the desired pattern 5 is therefore adapted by the shape of the target surface 3, which is for example not possible when applying such a pattern by a foil or other means known in prior art. The desired microstructure pattern 5 is so to say 3D-printed onto the otherwise finished target surface 3 of the vehicle 10. The vehicle 10 can also be embodied as an aeroplane, truck, car, etc. or parts of it to improve aerodynamics, even in a retrofit approach. Beside the mentioned known patterns, optimized topographies of the patterns and adoption of those patterns can be found, improved and optimized by experiments e.g. in wind channels or by drag and wave drag experiments.

Although this special aspect of an application of 3D micro structure by a application device 1 which applies a 3D micro-structure such as a sharkskin or lotus-effect pattern, can be seen as an independent invention, in particular independent on the technique used for referencing the application device 1 with respect to the target surface 3. This special aspect might be done without the global referencing, as an independent invention.

This embodiment comprises desired spattering data in 3D and the application device 1 builds up a three dimensional topography or structure, in particular by multiple layers of application material. Therefore, the nozzle 17 of the application device 1 can be movable in three dimensions or more. The application device 1 can be portable and usable in different locations and orientations, which brings advantage over the known static 3D-printers or stereo lithography devices, like those based on a portal with a Cartesian axes system.

What is claimed is:

1. A graphical application system configured to apply a desired pattern onto a large area arbitrarily shaped target surface, the system comprising:
   a graphical application device comprising:
   a base structure,
   at least one trackable optical feature at the base structure,
   at least one nozzle configured to expel paint onto the target surface,
   a driving unit configured to position the nozzle with respect to the base structure in at least two dimensions, and configured to adjust an expelling aim of the nozzle on the target surface, whereby an application range is defined as an area within which the nozzle is positionable by the driving unit,
   a local camera directed towards the target surface, and a controller configured to establish a local referencing of the nozzle with respect to a visual feature by imaging the target surface with the local camera, wherein the visual feature is a previously applied section of the desired pattern, and an external referencing device as a surveying instrument located remote from the graphical application device, configured to establish a global referencing of the base structure of the graphical application device with respect to the target surface according to the trackable optical feature of the base structure of the application device in at least three degrees of freedom, and configured to provide the global referencing to the controller, wherein the desired pattern is larger than the application range, and the controller is configured to split the desired pattern into multiple tiles, which tiles fit within the application range, and the controller is configured to subsequently applies those tiles with the controller configured to initiate a stepwise relocation of the graphical application device with respect to the target surface according to the global referencing, wherein the graphical application system comprises the controller configured to control the driving unit and the expelling of the nozzle according to an actual position of the nozzle and the desired pattern in such a way that an application of the desired pattern on the target surface is achieved, wherein the controller is configured to determine a primary alignment of the application range with respect to the target surface by the global referencing, wherein the controller is configured to determine with a further alignment of the actual tile to one or more previously applied tiles by the local referencing, and the controller configured to position the nozzle within the application range according to the local referencing.

2. The system according to claim 1, wherein the external referencing device is a geodetic instrument measuring position and orientation of the application device in polar coordinates, and determining the global referencing with a global position and orientation of the application device relative to the target surface in six degrees of freedom according to an optical surveying of at least one reference mark as the at least one trackable optical feature at the base structure, and comprising an opto-electronic distance measurement of the at least one reference mark.

3. The system according to claim 2, wherein the external referencing device is a laser tracker and the base structure of the application device comprises a retroreflector as the at least one trackable optical feature at the base structure.

4. The system according to claim 2, wherein the external referencing device is a motorized tachymeter and the application device comprises an ATR-retro-reflector as trackable feature.

5. The system according to claim 1, further comprising means for establishing a communication link between the application device and the external referencing device, in order to exchange spatial referencing information of the global and/or local referencing.

6. The system according to claim 1, wherein the application range of the application device is smaller than the size of the target surface by at least ½ or less.

7. The system according to claim 1, wherein the application device comprises a user-guidance unit configured to guide the relocation of the application device according to the global referencing with an optical user guidance by light indicators or a screen.

8. The system according to claim 1, wherein the driving unit positions the nozzle with respect to the base structure in three dimensions.

9. The system according to claim 1, wherein the local camera is configured to move with the nozzle.

10. The system according to claim 1, wherein the external referencing device is configured to global reference the base structure of the graphical application device with respect to the target surface according to the trackable optical feature of the application device in at least five degrees of freedom.

11. The system according to claim 1, wherein the controller is operably coupled with a non-transient machine readable medium having computer executable instructions for the controller to control the driving unit and expelling of the nozzle according to an actual position of the nozzle and the desired pattern in such a way that an application of the desired pattern on the target surface is achieved, with a primary alignment of the application range with respect to the target surface that is determined by the global referencing and with a further alignment of the actual tile to one or more previously applied tiles by the positioning of the nozzle within the application range that is determined by the local referencing, wherein:

the desired pattern is larger than the application range, and the desired pattern is split into multiple tiles, which tiles are fitting within the application range and which tiles will be subsequently applied with a stepwise relocation of the graphical application device with respect to the target surface.

* * * * *